United States Patent [19]
Holbein

[11] Patent Number: 5,772,776
[45] Date of Patent: Jun. 30, 1998

[54] PROCESS FOR THE RECOVERY OF HEAVY METALS SUCH AS LEAD FROM METAL CONTAMINATED SOIL

[76] Inventor: Bruce Edward Holbein, 44 Shadybrook Crescent, Guelph Ontario, Canada, N1G 3G5

[21] Appl. No.: 499,448

[22] Filed: Jul. 7, 1995

[51] Int. Cl.$^6$ ................................. B08B 7/00; C22B 3/00
[52] U.S. Cl. ................................. 134/2; 134/10; 134/13; 134/25.1; 134/42
[58] Field of Search ................................. 134/25.1, 2, 13, 134/10, 42

[56] References Cited

U.S. PATENT DOCUMENTS

| | | | |
|---|---|---|---|
| 3,957,664 | 5/1976 | Heilman et al. | 252/59 |
| 4,440,867 | 4/1984 | Sabherwal | 502/62 |
| 4,530,765 | 7/1985 | Sabherwal | 210/663 |
| 4,585,628 | 4/1986 | Fischer, Jr. et al. | 423/22 |
| 4,731,187 | 3/1988 | Moriya et al. | 210/719 |
| 4,746,439 | 5/1988 | Newman | 210/688 |
| 4,828,712 | 5/1989 | Reynolds et al. | 210/688 |
| 5,342,449 | 8/1994 | Holbein et al. | 134/2 |

FOREIGN PATENT DOCUMENTS

| | | |
|---|---|---|
| 1039238 | 4/1954 | Germany . |
| 142059 | 6/1980 | Germany . |
| 53-004354 | 1/1978 | Japan . |

OTHER PUBLICATIONS

Database WPI, Week 7808, Derwent Publications Ltd., London, GB; AN 78–15281A XP002012194 & JP, A, 53 004 354, Jan. 14, 1978.

Handbook of Organic Analytical Reagents, CRC Press Inc., 1982, pp. 389–400.

Buckman Laboratories, M3US, M4US, Oct. 1992.

Buckman Laboratories, M1US, Sep. 1993.

*Primary Examiner*—Zeinab El-Arini
*Attorney, Agent, or Firm*—Ronald S. Kosie; Robert Brouillette

[57] ABSTRACT

A process for decontaminating a metal contaminated soil aggregate wherein at least one water soluble dialkyldithiocarbamate is admixed with an initial soil slurry so as to obtain a product aqueous soil slurry comprising one or more water insoluble metal-dialkyldithiocarbamate complexes which insoluble complexes may then be physically separated from the soil slurry to leave behind a product having a metal contamination level lower than that of the initial contaminated soil.

43 Claims, No Drawings

PROCESS FOR THE RECOVERY OF HEAVY METALS SUCH AS LEAD FROM METAL CONTAMINATED SOIL

BACKGROUND TO THE INVENTION

The present invention relates to the decontamination of soil and the like (e.g. sediments, etc..) and, in particular, soils which are contaminated with metal as a result of the activities of human beings.

Contaminated soils, present, for example, on the sites of former or existing industrial complexes and containing excessively high amounts of lead (Pb) or other heavy metals pose serious risks to the health of the environment and, in particular, to human beings who come in contact with the contaminated soil. These problems from metal toxicity have been recognized and, consequently, governments have established limits for the amounts of metal which may be safely present in soils.

The problems associated with contaminated soils are recognized by governments as being sufficiently important that some have taken steps to establish guidelines or limits for the amount of metal which may be present in soils. Thus, for example, the Waste Management Branch of the provincial government of the province of Ontario (Canada) has issued "Guidelines for the decommissioning and cleanup of sites in Ontario; February 1989". Representative guidelines are illustrated in the following tables wherein Table a-1 shows the upper limits of normal concentrations of metals in soil for a number of metals; i.e. normal background content or levels of the listed metals; and Table a-2 shows clean-up guidelines with respect to the content or levels of certain metals.

TABLE a-1

Contaminant Guidelines Representing Upper Limits of Normal Concentrations in Ontario Surface Soil.

| Metal[1]   | Urban | Rural |
|------------|-------|-------|
| Antimony   | 8     | 1     |
| Arsenic    | 20    | 10    |
| Cadmium    | 4     | 3     |
| Chromium   | 50    | 50    |
| Cobalt     | 25    | 25    |
| Copper     | 100   | 60    |
| Iron (%)   | 3.5   | 3.5   |
| Lead       | 500   | 150   |
| Magnesium  | —     | 1     |
| Manganese  | 700   | 700   |
| Mercury    | 0.5   | 0.15  |
| Molybdenum | 3     | 2     |
| Nickel     | 60    | 60    |
| Selenium   | 2     | 2     |
| Vanadium   | 70    | 70    |
| Zinc       | 500   | 500   |

Notes:
[1]All units are in ppm ($\mu g/g$), dry weight, unless otherwise stated.

TABLE a-2

CLEAN-UP GUIDELINES FOR SOILS

| | Criteria for Proposed Land Use[1] | | | |
|---|---|---|---|---|
| | Agriculture/ Residential/Parkland | | Commercial/ Industrial | |
| Metal[2] | Medium & Fine Textured Soils | Coarse Textured Soils | Medium & Fine Textured Soils | Coarse Textured Soils |
| pH (recommended range) | 6–8 | 6–8 | 6–8 | 6–8 |
| Arsenic | 25 | 20 | 50 | 40 |
| Cadmium | 4 | 3 | 8 | 6 |
| Chromium (VI) | 10 | 8 | 10 | 8 |
| Chromium (total) | 1000 | 750 | 1000 | 750 |
| Cobalt | 50 | 40 | 100 | 80 |
| Copper | 200 | 150 | 300 | 225 |
| Lead | 500 | 375 | 1000 | 750 |
| Mercury | 1 | 0.8 | 2 | 1.5 |
| Molybdenum | 5 | 5 | 40 | 40 |
| Nickel | 200 | 150 | 200 | 150 |
| Selenium | 2 | 2 | 10 | 10 |
| Silver | 25 | 20 | 50 | 40 |
| Zinc | 800 | 600 | 800 | 600 |

Notes:
[1]Clean-up guidelines recommended by the Phytotoxicology Section, Air Resources Branch, Ministry of the Environment (Ontario).
[2]All units are in ppm ($\mu g/g$), dry weight, unless otherwise stated.

For the purposes of the present invention the following word(s) and expression(s), unless otherwise indicated, shall thereto:

the word "soil" and the like (whether as noun, adjective, etc.) shall be understood as referring to unconsolidated mantle (whether natural or man made) including material disposed on dry land masses;

sediment including any bottom sediments of fresh or marine water systems;

material which is wholly mineral or which in addition to mineral material, has an organic matter portion derived for example from plant or animal sources; organic material such as plant material would usually form part of the coarser aggregate material as described hereinafter and would include, for example, tree stumps, ligneous particles, etc. . . . ;

man-made mineral aggregate material and fill materials as well as man-made sediments arising in waterways; and mineral residues from mining operations, such as those present in a tailings pond;

the word "aggregate" and any similar word (whether as noun, adjective, etc.) shall be understood as referring to or as characterizing (or emphasising) a "soil", "sediment", "material" or any portion thereof as a mass of individual particles or components of the same or varied size (e.g. the size of the components may be not uniform and may range from microscopic granules to 10 cm and larger); it is also to be understood that the particle size distribution of any particular soil mass, etc. may be different from that of another soil mass, etc.;

the words/expressions "contaminated", "metal contaminated" and the like, when used in relation to the words "soil", "sediment", "material" and the like, shall be understood as referring to that portion of the unconsolidated mantle (whether natural or man made) which is contaminated, in any way whatsoever, whether voluntarily or otherwise;

the words "decontaminate", "decontamination" and the like shall, in relation to metal contaminated material, be understood as referring to a process or the material produced by a process wherein a material or part thereof is provided which has a reduced level of metal as compared to the original material;

the words "classify", "classification" and the like shall, be understood as referring to the dividing of an aggregate material into size groupings or portions and as including separation of constituent components in accordance with size, separation of constituent components by magnetic separation, desegregation to reduce particle size followed (as desired or necessary) by magnetic separation and/or separation by size (e.g. size separation by screening, gravity separation, etc.).

Metal contaminants include naturally occurring metals as well as metals which normally do not occur in nature (i.e. man made metals); the metals may be present as free or chemically combined species in any state of oxidation chemically possible. Metal contaminants include for example base metals, such as lead, zinc, mercury, cadmium, copper, nickel, chromium and cobalt, as well as other metals such as silver, molybdenum, selenium, arsenic and vanadium, etc. . . . Metal contaminants also include other inorganic species (such as for example metal complexes based on arsenates, selenates, etc. . . .) which when present in a soil (or sediment) are considered to be a contaminant.

Soils contaminated with excessive quantities of heavy metals are either restricted in their utilization or must be treated so as to remove the excessive quantities of metals.

A process for the decontamination of soils is taught in U.S. Pat. No. 5,342,449 wherein contaminating metal is solubilized for separation and recovery from the soil. This known process relies on the ability to solubilise the metal to be removed, as a first step. The metal enriched solution is then either separated from the soil particles or alternatively an insoluble metal adsorbent is added to absorb the metal thereto. In the later case, a metal adsorbent is used which has a particle size greater than that of the soil being decontaminated such that the metal-laden adsorbent may be physically separated from the soil slurry e.g. by filtration. In the case where metal rich solution is physically separated from the soil particles, the above mentioned U.S. patent teaches that the metal-laden solution, once separated from the soil particles, may be treated to precipitate the metal from solution using various chemical reagents including the dithiocarbamate family of reagents.

It would be advantageous to have alternate means for recovering metal from metal contaminated soils.

SUMMARY OF THE INVENTION

In accordance with the present invention, it has been determined that the water soluble dialkyldithiocarbamates, (e.g. sodium dimethyldithiocarbamate and the like), can be effectively used to recover Pb and other heavy metals in a soil slurry, so as to avoid the requirement of first solubilizing the metal as taught in the above mentioned U.S. patent.

Thus the present invention generally relates to the admixing of at least one water soluble dialkyldithiocarbamate with an initial soil slurry so as to obtain a product aqueous soil slurry comprising one or more water insoluble metal-dialkyldithiocarbamate complexes which may then be physically separated from the soil slurry to leave behind a product having a metal contamination level lower than that of the initial contaminated soil. In accordance with the present invention, any water soluble dialkyldithiocarbamate may be used provided that it is capable of forming the aforesaid water insoluble metal-dialkyldithiocarbamate complex which may then be physically separated from the rest of the obtained soil slurry.

Thus in a general aspect the present invention provides a process for the decontamination of a metal contaminated soil aggregate so as to obtain a product comprising a treated soil component having a metal content lower than that of the metal contaminated soil aggregate, said metal contaminated soil aggregate comprising at least one metal selected from the group comprising Pb, Hg, Cu, Cd, Zn, Ag, Ni, Co, Ga and Cr, said contaminated soil aggregate comprising a classified soil fraction representing soil particles having a size of from 0.15 mm and smaller (e.g. 0.1 $\mu$m to 0.15 mm), said process comprising providing an initial aqueous soil slurry comprising said metal contaminated soil aggregate, admixing at least one water soluble dialkyldithiocarbamate with said initial aqueous soil slurry so as to obtain a product aqueous soil slurry comprising one or more water insoluble metal-dialkyldithiocarbamate complexes, each of said water insoluble metal-dialkyldithiocarbamate complexes comprising a metal moiety, and separating one or more of said insoluble metal-dialkyldithiocarbamate complexes from said product aqueous soil slurry so as to obtain a treated aqueous slurry comprising a treated soil component having a metal content lower than that of said metal contaminated soil aggregate, and wherein the metal moiety of each of said one or more water insoluble metal-dialkyldithiocarbamate complexes is a member of the group comprising Pb, Hg, Cu, Cd, Zn, Ag, Ni, Co, Ga and Cr.

As mentioned above, in accordance with the present invention the aggregate to be treated is made up of particles which have a size of from 0.15 mm (i.e. 150 $\mu$m) or less; this aggregate may be obtained from a parent soil aggregate by using any suitable (known) classification technique such as will be described below.

It is to be understood that when two or more water insoluble metal-dialkyldithiocarbamate complexes are involved the individual species of complexes may i) each have the same metal moiety but different carbamate moieties;

ii) each have the same carbamate moiety but different metal moieties; or iii) each have different metal moieties and different carbamate moieties.

The type and sort of species will depend on whether or not the contaminated soil contains two or more types of heavy metals and/or whether or not two or more types of soluble carbamate are admixed with the initial contaminated slurry.

The treated slurry can be dewatered or else shipped off to a tailings pond for storage and later recovery if desired The process in accordance with the present invention may comprise, admixing with said initial soil slurry, one or more dialkyldithiocarbamates selected from the group comprising water soluble dialkyldithiocarbamates of formula

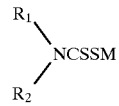

wherein $R_1$ and $R_2$ are independently selected from the group comprising alkyl groups of 1 to 6 carbon atoms, and M being is selected from the group comprising alkali metals, alkaline earth metals, and ammonium groups of formula $R_3R_4NHR_5$, $R_3$, $R_4$ and $R_5$ being independently selected from the group comprising an atom of hydrogen and alkyl groups of 1 to 6 carbon atoms.

$R_1$ and $R_2$ in the above formula may be the same; like-wise $R_3$, $R_4$ and R5 in the above formula may also be the same.

$R_1$, $R_2$, $R_3$, $R_4$, and $R_5$ may be straight chain or branched alkyl groups.

$R_1$ and $R_2$ may for example be methyl, ethyl, propyl, etc.; $R_3$, $R_4$, and $R_5$ may also for example be methyl, ethyl, propyl, etc.

M may in particular be an alkali metal such as for example sodium and/or potassium. The dialkyldithiocarbamate may for example be selected from the group comprising sodium dimethyldithiocarbamate, potassium dimethyldithiocarbamate, sodium diethyldithiocarbamate, potassium diethyldithiocarbamate including mixtures thereof. The dialkyldithiocarbamate may for example in particular be selected from the group comprising sodium dimethyldithiocarbamate, potassium dimethyldithiocarbamate including mixtures thereof.

The metal contaminated soil aggregate may comprise at least one metal selected from the group comprising Pb, Hg, Cu, and Cd, (in particular Pb) and the metal moiety of the metal-dialkyldithiocarbamate complexes may be selected from the group comprising Pb, Hg, Cu, and Cd (in particular Pb).

In accordance with the present invention the initial aqueous soil slurry may have a pH in the range of from 3.0 to 12.0.

In accordance with the present invention, the amount of the dialkyldithiocarbamate(s) to use will of course be a function of the type of dialkyldithiocarbamate used, the metal(s) to be removed, the amount of metal to be separated, etc. The dialkyldithiocarbamate(s) may, for example, be admixed with the initial aqueous slurry at a concentration ranging from about 0.1 kg to about 25 kg thereof per tonne (i.e. per metric ton or per 1000 kg) of the contaminated soil aggregate present in the initial slurry;

In accordance with the present invention, one or more of the water insoluble metal-dialkyldithiocarbamate complexes may be separated from the product aqueous soil slurry by a liquid-liquid extraction treatment so as to obtain a treated aqueous slurry comprising a treated soil component having a metal content lower than that of said metal contaminated soil aggregate. The liquid-liquid extraction treatment may comprise contacting the product slurry with a water immiscible liquid organic solvent capable of solubilizing one or more of said metal-dialkyldithiocarbamate complexes such that said solvent is able to take up one or more of said metal-dialkyldithiocarbamates and become loaded therewith. The solvent loaded with one or more metal-dialkyldithiocarbamates may, as desired or necessary, be separated from said so treated product slurry.

Any suitable solvent may be used provided that the solvent is water immiscible and is able to take up the desired metal-dialkyldithiocarbamate complexes). The solvent may for example comprise a member selected from the group comprising hexane, chloroform, carbon tetrachloride and mixtures thereof.

Alternatively, in accordance with the present invention, one or more metal-dialkyldithiocarbamate complexes may be separated from the product aqueous soil slurry by a froth flotation treatment so as to obtain a treated aqueous slurry comprising a treated soil component having a metal content lower than that of the metal contaminated soil aggregate and a aqueous concentrate slurry comprising one or more of the metal-dialkyldithiocarbamate complexes. The froth flotation treatment may include the addition of any (known) substance which facilitates the attachment particles of the insoluble complex(es) to the liquid-air interface of the rising air bubbles as well as, if desired or necessary, any suitable (known) froth promoting agent, these frothing materials being added to an initial soil slurry comprising an above mentioned water insoluble metal complex(es) prior to the separation of such metal complex(es) by froth flotation; suitable froth separation materials may for example be obtained from Dow Chemical Corporation such as Hart Unifroth S.

The froth flotation treatment may if desired include the addition of an effective amount of a water immiscible solvent for said metal-complex to said initial soil slurry for facilitating the separation of said metal-dialkyldithiocarbamate complex(es) by froth flotation; the solvent may, for example, comprise hexane.

In accordance with the present invention the contaminated soil aggregate particles may, for example, comprise or consist of particles having a size of less than 106 $\mu$m (e.g. less than 50 $\mu$m). Thus, the particles having a size of less than 106 $\mu$m (e.g. less than 50 $\mu$m) may for example comprise at least 15% by weight (dry weight) of the contaminated soil aggregate (e.g. they may comprise all of the aggregate to be treated). It is to be understood that the reference to size is a reference to size in relation to the classification by screening, gravity separation, etc.; e.g. the reference to less than 106 $\mu$m means that the particles concerned are those which may pass through a 106 $\mu$m screen.

The dialkyldithiocarbamates which may be used in the present invention, are chemical molecules possessing a metal chelating ligand group, the dithiocarbamate group, on one portion of the molecule and alkyl carbon chains on the other portion of the molecule. Consequently such substances are both water soluble and organic solvent soluble, the polar dithiocarbamate ligand group providing the water solubility due to its charged nature. When the dithiocarbamate group ligates with a metal such as for example Pb, its charge is neutralized and, thus, the metal dialkyldithiocarbamate complex becomes water insoluble, but the metal-dialkyldithiocarbamate's solubility in organic solvents, such as chloroform, is retained.

This metal insolubilization phenomenon has been used in analytical chemistry to provide a means of collecting heavy metals from aqueous solutions for subsequent analysis.

Chemical reagents with some properties in common to the dialkyldithiocarbamates have been used in the minerals processing industry as mineral flotation collectors. Thus the dialkyldithiophosphates, dialkyldithionocarbamates and the alkyldithiocarbonates (xanthates) have seen used for the activation of metal-sulphide mineral particles enabling their recovery by froth flotation. Mineral activation in this case is by virtue of "thiol" group reactivity with Cu, Zn or Pb when present within mineral particles, primarily in the form of metal-sulphides. The alkyl groups impart water-repellency to the mineral particle, thus facilitating its recovery by froth flotation, i.e. mineral particle is recovered.

Contaminant metal in a soil is, however, not present as a predominant mineral structure as found naturally for metal minerals but rather contaminant metal often represents a heterogenous mixture of metal species, e.g. where carbonates, sulphates, sulphides, phosphates and oxides of the contaminant metal would predominate.

Additionally the starting minerals for froth flotation contain for example 2 to 8% (w/w) Pb or other metals while soils even when highly contaminated usually have initial Pb or other metal concentrations of <2% (w/w).

The dialkyldithiocarbamates are not widely used in the minerals industry because other reagents such as the dialkyldithiophosphates, dialkylthionocarbamates and alkyldithiocarbonates are known to have similar properties and provide similar results for minerals recovery at lower costs. In terms of the present invention, however, it has been discovered that, while dialkyldithiocarbamates provide efficient recovery of Pb and other heavy metals from suspensions of soil particles, other reagents including the alkyldithiocarbonates, the dialkyldithiophosphates and dialkylthionocarbamates provided only low efficiencies of recovery of Pb when tested under similar conditions.

Mineral flotation in the mining industry for metallic ores is generally performed on milled ore of a size less than 48 mesh and from which the very fine mineral particles "slimes", of a size less than 50 $\mu$m in diameter (e.g. less than 10 $\mu$m in diameter), have been removed. Slimes are generally regarded as problematic to efficient recovery in mineral flotation even though their rejection results in losses of otherwise valuable metal content. Typically, slimes are removed by physical separation just prior to the addition of flotation mineral recovery reagents.

In the context of the present invention, the ability to remove and recover Pb and other heavy metals from very fine soil particles of $\leq$50 $\mu$m (e.g. $\leq$10 $\mu$m) is extremely important. Many soils have a very high content of such very fine particles, for e.g. a clay soil, and this fine soil component can carry the bulk of the contaminant metal. A Pb-contaminated clay soil examined in the course of the present invention was found to have 52% of its total soil mass present as fine "slimes" and this contained 77% of the total Pb content of the contaminated soil. In one aspect of the present invention it has been discovered that dialkyldithiocarbamates can efficiently recover Pb from this very fine soil fraction.

In a principle aspect of the present invention a metal-contaminated soil suspension is contacted with sufficient amounts of a suitable dialkldithiocarbamate under conditions which permit the reaction of the reagent with a portion of the contaminant Pb and other heavy metals. The obtained insoluble metal-dialkyldithiocarbamate complexes are then recovered by physical means relying on the decreased water solubilities of the metal dialkylthiocarbamate complexes. The recovered metal-dialkyldithiocarbamate complexes may be dewatered by filtration and may then be available for recycling of the contained metal, e.g. to a metal refinery.

The decontaminated soil slurry with its reduced heavy metal content may also be dewatered and the obtained soil filter cake may be returned as a clean decontaminated soil for re-use as soil.

The soil slurry to be treated as mentioned above is made using a contaminated soil aggregate which comprises a classified soil fraction representing soil particles having a size of from 0.15 mm and smaller (e.g. 0.1 $\mu$m to 0.15 mm). The soil slurry typically would be in the form of an aqueous suspension containing soil particles in the range of, for example 0.5% w/w to 50 w/w of soil slurry weight and at a pH in the range of, for example, pH 3.0 to pH 12.0. The dialkyldithiocarbamate may be added as an aqueous solution generally in the form of the Na or K salt. Specifically the dialkyldithiocarbamate can be an aqueous solution of Na-dimethyldithiocarbamate or Na-diethyldithocarbamate. The dialkyldithiocarbamate is added in sufficient quantities so as to react with as much of the soil slurry contained Pb and other heavy metal as necessary. Rates of addition can be, for example, in the range of 0.1 to 25 kg of reagent per tonne of soil slurry solids.

Heavy metals for recovery include Pb, Hg, Cd, Zn, Cu, Ni, Ag and other metals which are capable of forming insoluble complexes with the initially water soluble dialkyldithiocarbamate.

Any known procedure may be used for the physical recovery of water insoluble complexes of metal and dialkyldithiocarbamate which take advantage of the low water solubilities of these complexes.

Recovery may, for example, be performed by a solvent extraction wherein the aqueous soil slurry with water insoluble metal-dialkyldithiocarbamate complex is mixed with an organic solvent which is non miscible in water. In this case the metal-dialkyldithiocarbamate complexes partition into the non water miscible organic phase thereby leaving the aqueous phase. The water/soil slurry and organic phases are thereafter separated, for example, by decantation, to yield a separated aqueous/soil slurry phase substantially free of metal-dialkyldithiocarbamate complexes and a separated organic phase containing the recovered metal-dialkyldithiocarbamate complexes.

Suitable organic solvents for this separation are chloroform, hexane or other organic solvents which are non miscible with water but which will solubilize the metal-dialkyldithiocarbamate complexes.

Another means for the recovery of metal-dialkyldithiocarbamate from the reacted aqueous soil slurry employs froth flotation similar in terms of equipment utilization and principles of operation to that used in the mining industry. Flotation equipment as manufactured by the Denver Equipment Company is suitable for this type of recovery.

In another aspect of the present invention it has been found that the efficiency of the recovery of metal-dialkyldithiocarbamate complexes from the reacted aqueous soil slurry can be improved by the addition of an organic carrier material such as kerosene, diesel fuel or other water insoluble hydrocarbon. The addition of carrier organic material is particularly useful when employing flotation recovery as the means of recovering the metal-dialkyldithiocarbamate complexes. Kerosene, when added to the reacted soil slurry at between 0.001 to 1 kg per tonne of soil solids, prior to flotation separation, has improved overall recoveries of the metal-dialkyldithiocarbamate complexes.

In another aspect of the present invention, the addition of water soluble organic reagents for example, ethanol, at for example 0.01 to 1.0% (v/v) of reacted soil slurry has been found to assist the recovery of metal-dialkyldithiocarbamate complexes as subsequently recovered using, for example, froth flotation.

In general any suitable means for efficient recovery of metal-dialkyldithiocarbamate complexes from reacted aqueous soil slurry, whether initially present as "free" complexes or complexes initially associated with other minerals or organic soil constituents is appropriate to the present invention.

A soil mass (i.e. a soil aggregate) is made up of groups of material, the groups of elements having sizes which vary from relatively coarse to relatively fine material. The soil mass does not necessarily have a homogeneous distribution of metal among the various size groupings. On the contrary, it has been determined that for such a soil mass there can be a heterogenous distribution of metal among the various size groupings, e.g. the larger sized materials may have acceptable (i.e. relatively low) levels or concentrations of metal whereas the smallest sized materials may have unacceptable levels of metal associated therewith (i.e. a relatively high metal content).

Thus in accordance with the present invention such an aggregate soil mass may be treated by (simple) physical means to segregate the soil mass (in accordance with the size of the components thereof) into a noncontaminated or weakly contaminated fraction(s) and an unacceptably contaminated fraction(s). The divided soil aggregate portion(s) having acceptable metal levels may be released into the environment. The other soil aggregate portion(s) having unacceptable levels of metal may be dealt or treated by the process of the present invention.

The soil classification process may, for example, comprise

I) classification of a metal contaminated aggregate soil into
  PRIMARY COARSE MATERIALS (e.g. material of screen size greater than about 50 mm) subjected, if desired, to a magnetic separation stage prior to transport, for example, to a land fill site
  SECONDARY COARSE MATERIALS (e.g. material of screen size less than about 50 mm)

II) classification of SECONDARY COARSE MATERIALS with water washing into
  TERTIARY COARSE MATERIALS (e.g. material of screen size greater than about 3.0 to 7.0 mm) subjected, if desired, to a magnetic separation stage prior to transport, for example, to a land fill site
  FINE MATERIALS (e.g. material of screen size less than about 3.0 to 7.0 mm)

III) desegregation of FINE MATERIALS in the presence of water and classification into
  UNPOLISHED FINE MATERIALS (e.g. materials of screen size greater than about 0.15 mm (e.g. greater than about 0.1 mm)) which, if necessary, may be subjected to a polishing wash with weak or dilute metal extraction liquor and, if desired, to a magnetic separation stage prior to transport, for example, to a land fill site
  UNREFINED FINE MATERIALS (e.g. materials of screen size less than about 0.15 mm (e.g. less than about 0.1 mm)) for delivery to a metal removal stage.

(The classification may be carried out at ambient temperature and pressure conditions.)

The above example classification sequence may of course be modified to take into consideration the metal content of the particle size groupings of the aggregate material to be classified.

Generally, prior to classification of a soil aggregate, a representative sample thereof may be taken and analyzed to determine the distribution characteristics of metal among various size groupings of the components which make up the soil. The analysis proceeds in two general stages namely, a first stage whereby the sample is classified (i.e. divided up) into desired component size groupings and a second stage wherein each component size grouping is analyzed chemically for its metal content as well as magnetically for ferric metal content; the classification and analysis may be done in known manner.

In any event, the classification process itself proceeds with an eye to physically divide the aggregate soil into a portion having an acceptable (e.g. environmentally acceptable) level of metal and a portion having an unacceptable level of metal content. Generally, this is achieved by obtaining an oversize portion (which is acceptable) and an undersize portion (which is unacceptable). The overall amounts of oversize and final screen size materials after classification will of course vary with the actual starting material being processed.

It has been found, however, that classifying to produce a fines portion of a size less than or equal to about 0.15 mm (e.g. less than or equal to 0.106 mm, i.e. −106 $\mu$m) and an oversize portion of greater than or equal to about 0.15 mm (e.g. greater than or equal to 0.106 mm, i.e. +0.106 $\mu$m), produces desirable results; metal contaminants tend to be present in reduced quantities in the oversize (+)0.106 mm portion. The size range for the oversize and the fines of any given aggregate soil will, however, in general, be determined with an eye preferably to recovering as much oversize material as possible which is low enough in metal content so as to be environmentally acceptable and to minimize the amount of material having an environmentally unacceptable metal content. In accordance with the present invention, oversize may, for example, comprise material of size greater than 0.106 mm to 10 cm and larger and the undersize may, for example, comprise material of size less than 0.106 mm to 0.001 mm or smaller; where appropriate, the final screen mesh size could of course be increased or decreased, so as to maximize this step, i.e. obtain as much oversize not requiring further treatment as possible.

Thus, generally, the first step in processing (the bulk) of the aggregate soil mass involves passing the aggregate soil through a suitable coarse screen to remove large debris (e.g. material having a size of >50 mm).

The obtained undersized secondary coarse screened material may then be processed through a vibration screen to segregate or divide out materials having a size greater than a predetermined desired size (for example from about 3 to 7 mm). During this screening operation water washing may be carried out to clean the oversize materials as well as to assist smaller materials through the screen, and to effect a partial desegregation of any friable components.

Classified coarse materials (e.g. materials of a size greater than about 3.0 to 7.0 mm) of the contaminated soil may be substantially free of or have a (sufficiently low) level of metal contamination which meets present environmental criteria; please see, for example, the above mentioned Ontario guidelines. These classified coarse materials, thus generally, will not require a chemical treatment as shall be described below. However, in the case where scrap iron materials and the like may be present at unacceptable levels, a magnetic separation step (using known magnetic separation equipment such as is employed in the mining industry) has been found to be advantageous; scrap iron along with other associated metal contaminants can thus be physically removed from the coarse fraction as material which is magnetically attracted and separated. The obtained environmentally acceptable classified coarse material, consisting of bits of wood debris, stones, etc. can generally, if desired, be used as backfill.

Depending on the nature of the aggregate soil a magnetic separation step may, if desired, be carried out prior to any other type of classification such as by screening or otherwise.

Magnetic separation will provide materials enriched in magnetically separable materials, leaving behind materials depleted in magnetically separable materials.

The obtained undersized materials (e.g. materials of a size less than about 3.0 to 7.0 mm) may be further classified by first being subjected to mechanical conditioning (i.e. dispersed in water so as to form a slurry) using for example a combination of attrition conditioners, high speed conditioners or other equipment capable of causing a substantial desegregation of materials into particles of a finer size; i.e. for subsequent classification.

Various types of known equipment used in the minerals industry may be employed for the conditioning purposes. The Denver Equipment Co. "Attrition Scrubber" may for example be used to this end.

Conditioned, desegregated materials are then classified through a series of slurry screens or other means of classification (e.g. by a spiral classifier or a hydrocyclone scrubber such as those manufactured by the Denver Equipment Co.) so as to obtain oversize unpolished fine material and undersized unrefined fine material. For example, the desegregated materials may be classified through a graded series of one or more vibrating wet washed screens of, for example, screen sizes between 3.0 mm and 0.05 mm (standard mining screens—e.g. Tyler Screens from Tyler Equipment Co.).

Oversize materials include sand, etc. and can, if necessary, be subjected to a magnetic separation treatment to remove iron and associated metal contaminants.

Advantageously, undersize unrefined fine materials, (e.g. materials of size less than about 0.106 mm), carrying the unacceptable levels of metal contaminants may then be adjusted in terms of water and solids contents by means of a gravity thickener, so as to produce a solids in water suspension of the desired solid content, viscosity and specific gravity for further chemical processing (as described herein).

If advantageous, the unrefined fine materials can be subjected to a further physical treatment by using a gravity separation step, for e.g. spiral classification. For example, any means of physical treatment which will minimize the overall amount of unacceptable material destined for further processing is desirable.

Since the various fractions of the starting soil aggregate themselves comprise a plurality of associated particles these fractions shall be understood as falling within the meaning of the expressions "aggregate material", "soil aggregate", etc. as used herein with respect to the present invention.

Thus, as may be appreciated from the foregoing, in accordance with the present invention a soil aggregate may if not already of the desired size be subjected to a process for separating a coarse soil aggregate size fraction from a metal contaminated soil aggregate comprising a plurality of differently sized components, wherein said metal contaminated soil aggregate comprises said coarse soil aggregate size fraction and a second soil aggregate size fraction, said coarse soil aggregate size fraction comprising components larger than the components of the second soil aggregate size fraction, said coarse soil aggregate size fraction having a metal concentration lower than that of the metal contaminated soil aggregate, said second soil aggregate fraction having a metal concentration higher than the metal concentration of said coarse soil aggregate size fraction, and wherein the metal contaminated soil aggregate is classified so as to segregate said coarse soil aggregate size fraction and said second soil aggregate size fraction.

EXAMPLES

The following non-limiting examples are provided by way of example only to describe the invention.

Example 1. Preparation of Contaminated Soil Slurry

A 10 kg sample of soil obtained from a site which had become contaminated with Pb due to stack emissions from a Pb smelter was mixed with 20 liters of tap water in a concrete mixer for 3 hours so as to desegregate the soil. The soil suspension was then processed successively through classification screens of 1.18 mm, 0.355 mm and 0.106 mm openings so as to obtain fractions of the different size ranges (above) and a slurry suspension of soil particles of a size <0.106 mm. This fraction was allowed to settle for 30 minutes in a bucket after which the unsettled slimes were harvested, separated from the settled grits. Pb assays were performed on each fraction and mass yields for soil particles and Pb were determinate with results as below.

| Soil fraction | % of soil mass | Pb concentration ppm | % of total Pb |
| --- | --- | --- | --- |
| +1.18 mm | 27.1 | — | 0 |
| −1.18 mm + 0.355 mm | 7.1 | 1515 | 6.3 |
| −0.355 mm + 0.106 mm | 11.1 | 1952 | 12.8 |
| −0.106 mm grits | 2.6 | 2748 | 4.2 |
| −0.106 mm slimes | 52.1 | 2492 | 76.7 |
| Total | 100 | — | 100 |

The slimes fraction, predominantly <106 $\mu$m soil, particle size represented approximately 50% of the total soil mass of this clay-type soil and contained approximately 75% of the total contaminating Pb. This Pb-rich soil slimes slurry was used as a test material for the other examples (below).

Example 2. Inability of Typical Minerals Industry Flotation to Recover Lead from Slimes Containing Soil Slurry 2.A. A sample of soil slurry (−106 $\mu$m slimes) obtained as disclosed in example 1 was treated with sodium sulphide (approx. 350 g per tonne soil solids) and then with sodium isopropyl xanthate (an alkyldithiocarbonate) at approximately 120 g/tonne. After a period of 5 minutes mixing, a frother (Dow Froth DF250) was added at approximately 25 g/tonne. The resulting froth was harvested using a Denver laboratory scale flotation device. A second addition of sodium isopropyl xanthate was made at 120 g/tonne followed by additional frother, 8 g/tonne of DF250. The second froth was harvested. A third addition was made of sodium isopropyl xanthate (120 g/tonne) after which no additional frother was added but a third harvest of floatable material was obtained.

The three float harvests (above) were pooled, filtered, dried, weighed and assayed for Pb. The flotation tails (non-floated mass) was also harvested and assayed as above.

The mass and Pb distributions were compared as below.

| Sample | % Total Mass | % Total Pb |
| --- | --- | --- |
| Flotation concentrate | 19.1 | 23.1 |
| Flotation tails | 80.9 | 76.9 |
| Slurry feed | 100 | 100 |

This result showed no selective recovery of Pb from the soil slurry when treated using a typical Pb recovery treatment protocol as might be used in recovery of Pb minerals (reference: Crozier, R. D. Flotation, p. 75, Permagon Press, 1992).

2.B. Soil slurry, comprising slimes and coarser particles up to a size of approximately 0.15 mm, was processed through a hydrocyclone so as to separate the slurry approximately into a coarser particle underflow fraction with lower slimes content and a slimes rich overflow fraction. The underflow fraction represented approximately 35% of the initial soil mass with >50% of this mass being of a size >38 μm. The underflow was then subjected to a flotation treatment similar to that described for Example 2.A. The mass and Pb distributions in the resulting flotation concentrate and tailings were as below.

| Fraction | % Soil Mass | % Total Pb |
|---|---|---|
| Flotation concentrate | 16.8 | 82.5 |
| Flotation tailings | 83.2 | 17.5 |

Thus, the removal of the slimes (small size particles) fraction permitted the recovery of Pb from the slimes depleted soil slurry when employing a typical Pb flotation recovery as applied in the minerals processing industry. This is in direct contrast to the results of Example 2A where the presence of the soil slimes fraction prevented Pb recovery by standard flotation procedures.

Example 3. Complexation of Pb by Na-dialkyldithiocarbamate and Recovery of Pb-dialkyldithiocarbamate Complex to Organic Medium A sample of the −106 μm slimes fraction as prepared in example 1 and of a solids concentration of 10% w/w was reacted at pH 7.5 with mixing for 15 minutes with Na-dimethyldithiocarbamate, added at a dosage of 5 kg reagent per tonne of soil solids. A sample of the reacted soil and a sample of untreated soil were extracted with hexane using two sequential extractions for each sample (2×10 ml hexane per 50 ml soil slurry). The hexane was allowed to separate from the aqueous soil slurry in a separatory funnel and thereafter collected. The two hexane extracts from each soil slurry were pooled. The hexane extracts from each soil slurry and the residual aqueous soil slurries were then dried, weighed an assayed for their Pb contents. The results are shown below.

| Sample | % Soil Mass | % Total Pb |
|---|---|---|
| Non-reacted soil: | | |
| hexane extract | 9.4 | 12.7 |
| aqueous residue | 90.6 | 87.3 |
| Dialkyldithiocarbamate reacted soil: | | |
| hexane extract | 24.9 | 52.6 |
| aqueous residue | 75.1 | 47.4 |

These results showed that for soil slurry not reacted with dialkyldithiocarbamate only a small portion of the total Pb is recoverable to the hexane phase whereas after reaction of the soil slurry with Na-dimethyldithiocarbamate a substantial amount of the Pb is recoverable by hexane, thus indicating the presence of Pb-dimethyldithiocarbamate complexes.

Example 4. Recovery of Pb-dimethyldithiocarbamate Complexes from Reacted Soil Slurry by Froth Flotation A 2 liter sample of −0.106 mm slimes fraction at a solids concentration of 10% w/w, as prepared in example 1, was reacted at pH 8.0 with 5 kg per tonne of soil solids of sodium dimethyldithiocarbamate for 15 minutes. Kerosene was then added to the reacted slurry at a dosage of 1 gram per tonne of soil solids followed by 10 μl of a 10%(v/v) dilution of Hart Unifroth S (diluted in ethanol).

The mixture was then processed in a flotation test cell (a Denver laboratory test cell) with the harvested froth and final non-float residues being dried, weighed and assayed for Pb.

The results are shown below.

| Sample | % Soil solids | Pb concentration ppm | % Total Pb |
|---|---|---|---|
| Unreacted slurry | 100 | 2492 | 100 |
| Harvested float fraction | 14.4 | 8796 | 50.1 |
| Flotation tails | 85.6 | 1401 | 49.9 |

These results confirmed that Na-dimethyldithiocarbamate when added to the soil slurry formed Pb-dimethyldithiocarbamate complexes which were recovered by flotation separation, thus enabling the recovery of approximately 50% of the initial soil Pb content into a recoverable mass representing approximately only 15% of the initial soil particle mass.

Example 5. Reagent Specificity for Pb Recovery

Various flotation reagents of differing structures and as used in the minerals industry and all containing thiol group reactively for metals were tested in comparison to Na-dimethyldithiocarbamate using similar dosages, i.e. 5 kg per tonne of soil solids, with other conditions the same as described for example 4. The results were as shown below.

| Reagent | Chemical type | % Mass Recovered | % Pb recovered |
|---|---|---|---|
| Na isopropyl xanthate | alkyldithiocarbonate | 12 | 12 |
| Hoechst HD diisobutyldithiophosphate | dialkyldithiophosphate | 18 | 21 |
| Cyamid Aero 5100 | dialkylthionocarbamate | 27 | 24 |
| Na-dimethyldithiocarbamate | dialkyldithiocarbamate | 18.9 | 51 |

The results showed that other reagents with activities related to thiol (SH) group activity were not effective in reacting with the Pb so as to facilitate its recovery as an organic, Pb-reagent complex. Only the dialkyldithiocarbamate was effective for this.

Example 6. Pb-dimethyldithiocarbamate Recovery by Adjunct Addition

Soil slurry samples of −0.106 mm as prepared in accordance with example 1 were reacted for 15 min with 5 kg per tonne of Na-dimethyldithiocarbamate as for example 4. After the reaction period various additions were made to separate samples of the reacted slurry to investigate the influence of the recovery of Pb-dimethyldithiocarbamate complexes. The results of these additions are shown below.

| Condition | % Mass recovered | % Pb recovered |
|---|---|---|
| a Aeroflot 3477 (dialkyldithiophosphate) 1 kg/ton added prior to flotation | 25 | 68 |
| b Aeroflot 5100 (dialkylthionocarbamate) 1 kg/ton added prior to flotation | 20 | 50 |
| c 1 g/ton kerosene plus 10 ul/L 10% Unifroth S added prior to flotation | 18 | 50 |
| d As for c, then; primary float removed and residues treated with 0.1% hexane (v/v); additional 5 kg/t dimethyldithiocarbamate sample refloated; overall recovery reported for both float products | 27 | 74 |
| e As for c, then; Primary float removed and residues treated with Triton X-100, .01% (v/v); additional 5 kg/t dimethyldithiocarbamate sample refloated; overall recovery reported for both float products | 24 | 85 |

These results demonstrate that the bulk of the Pb in the initial soil slurry was available for reaction and recovery by dimethyldithiocarbamate.

Example 7. Recovery of Other Metals from Soil Slurry by Dimethyldithiocarbamate

The soil slimes slurry as prepared in example 1 was examined primarily due to its Pb content but harvested metal-dimethyldithiocarbamate complexes were also analyzed for the presence of other metals, i.e. for comparative purposes.

| | ppm Metal | | | | |
|---|---|---|---|---|---|
| Sample | Pb | Fe | Cu | Ni | Zn |
| Unreacted soil slimes solids | 1957 | 51,601 | 112 | 82 | 346 |
| Recovered flotation product as obtained in example 4 | 15,043 | 71,748 | 408 | 107 | 414 |

These results show that the dimethyldithiocarbamate is reactive with other metals and facilitates their recovery similarity as for Pb. On this basis, utilities for Hg, Cd, Cu and Pb can be predicted based on the known affinities this reagent has for these metals in solutions, not containing soils.

I claim:

1. A process for decontaminating a metal contaminated soil aggregate so as to obtain a product comprising a treated soil component having a metal content lower than that of the metal contaminated soil aggregate, said metal contaminated soil aggregate comprising at least one metal selected from the group comprising Pb, Hg, Cu, Cd, Zn, Ag, Ni, Co, Ga and Cr, said contaminated soil aggregate comprising a classified soil fraction representing soil particles having a size of from 0.15 mm and smaller, said process comprising providing an initial aqueous soil slurry comprising said metal contaminated soil aggregate;

admixing at least one water soluble dialkyldithiocarbamate with said initial aqueous soil slurry so as to obtain a product aqueous soil slurry comprising one or more water insoluble metal-dialkyldithiocarbamate complexes, each of said water insoluble metal-dialkyldithiocarbamate complexes comprising a metal moiety; and separating one or more of said insoluble metal-dialkyldithiocarbamate complexes from said product aqueous soil slurry so as to obtain a treated aqueous slurry comprising a treated soil component having a metal content lower than that of said metal contaminated soil aggregate, and wherein the metal moiety of each of said one or more water insoluble metal-dialkyldithiocarbamate complexes is a member of the group comprising Pb, Hg, Cu, Cd, Zn, Ag, Ni, Co, Ga and Cr.

2. A process as defined in claim 1 comprising admixing with said initial aqueous soil slurry one or more dialkyldithiocarbamates selected from the group comprising water soluble dialkyldithiocarbamates of formula

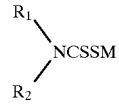

wherein $R_1$ and $R_2$ are independently selected from the group comprising alkyl groups of 1 to 6 carbon atoms, and M is selected from the group comprising alkali metals, alkaline earth metals, and ammonium groups of formula $R_3R_4NHR_5$, $R_3$, $R_4$ and $R_5$ being independently selected from the group comprising an atom of hydrogen and alkyl groups of 1 to 6 carbon atoms.

3. A process as defined in claim 2 wherein said metal contaminated soil aggregate comprises at least one metal selected from the group comprising Pb, Hg, Cu, and Cd, and wherein the metal moiety of said one or more water insoluble metal-dialkyldithiocarbamate complexes is selected from the group comprising Pb, Hg, Cu, and Cd.

4. A process as defined in claim 3 wherein R1 and R2 are the same and wherein M is selected from the group comprising sodium and potassium.

5. A process as defined in claim 4 wherein $R_1$ and $R_2$ are selected from the group comprising methyl and ethyl.

6. A process as defined in claim 3 wherein said dialkyldithiocarbamate is selected from the group comprising sodium dimethyldithiocarbamate, potassium dimethyldithiocarbamate and mixtures thereof.

7. A process as defined in claim 3 wherein the initial aqueous soil slurry has a pH of from 3.0 to 12.0.

8. A process as defined in claim 3 wherein said dialkyldithiocarbamate is admixed with said initial aqueous soil slurry at a concentration ranging from about 0.1 kg to about 25 kg thereof per tonne of said metal contaminated soil aggregate present in said initial aqueous soil slurry.

9. A process as defined in claim 3 wherein one or more of said water insoluble metal-dialkyldithiocarbamate complexes is separated from said product aqueous soil slurry by a liquid-liquid extraction treatment so as to obtain said treated aqueous slurry comprising a treated soil component having a metal content lower than that of said metal contaminated soil aggregate, said liquid-liquid extraction treatment comprising contacting said product aqueous soil slurry with a water immiscible liquid organic solvent for solubilizing one or more of said metal-dialkyldithiocarbamate complexes such that said solvent is able to take up one or more of said metal-dialkyldithiocarbamates and become loaded therewith.

10. A process as defined in claim 9 wherein when said solvent is loaded with one or more metal-dialkyldithiocarbamates, said solvent is separated from said treated aqueous slurry.

11. A process as defined in claim 10 wherein said solvent comprises a member selected from the group comprising hexane, chloroform, carbon tetrachloride and mixtures thereof.

12. A process as defined in claim 10 wherein said solvent comprises hexane.

13. A process as defined in claim 10 wherein said dialkyldithiocarbamate is selected from the group comprising sodium dimethyldithiocarbamate, potassium dimethyldithiocarbamate and mixtures thereof.

14. A process as defined in claim 13 wherein said solvent comprises hexane.

15. A process as defined in claim 3 wherein one or more metal-dialkyldithiocarbamate complexes are separated from said product aqueous soil slurry by a froth flotation treatment so as to obtain said treated aqueous slurry comprising a treated soil component having a metal content lower than that of said metal contaminated soil aggregate and an aqueous concentrate slurry comprising one or more of said metal-dialkyldithiocarbamate complexes.

16. A process as defined in claim 15 wherein said dialkyldithiocarbamate is selected from the group comprising sodium dimethyldithiocarbamate, potassium dimethyldithiocarbamate and mixtures thereof.

17. A process as defined in claim 15 wherein said froth flotation treatment comprises adding an effective amount of a water immiscible solvent for said metal-complex to said initial aqueous soil slurry for facilitating the separation of said metal-dialkyldithiocarbamate complexes by froth flotation.

18. A process as defined in claim 17 wherein said dialkyldithiocarbamate is selected from the group comprising sodium dimethyldithiocarbamate, potassium dimethyldithiocarbamate and mixtures thereof.

19. A process as defined in claim 18 wherein said solvent comprises hexane.

20. A process as defined in claim 3 wherein soil aggregate particles having a size of less than 50 $\mu$m comprise at least 15% by weight (dry weight) of said contaminated soil aggregate.

21. A process as defined in claim 3 wherein said contaminated soil aggregate comprises a classified soil fraction representing soil particles having a size of less than 106 $\mu$m.

22. A process as defined in claim 1 wherein the initial aqueous soil slurry has a pH of from 3.0 to 12.0.

23. A process as defined in claim 1 wherein said dialkyldithiocarbamate is admixed with said initial aqueous soil slurry at a concentration ranging from about 0.1 kg to about 25 kg thereof per tonne of said metal contaminated soil aggregate present in said initial aqueous soil slurry.

24. A process as defined in claim 1 wherein one or more of said water insoluble metal-dialkyldithiocarbamate complexes is separated from said product aqueous soil slurry by a liquid-liquid extraction treatment so as to obtain said treated aqueous slurry comprising a treated soil component having a metal content lower than that of said metal contaminated soil aggregate, said liquid-liquid extraction treatment comprising contacting said product aqueous soil slurry with a water immiscible liquid organic solvent for solubilizing one or more of said metal-dialkyldithiocarbamate complexes such that said solvent is able to take up one or more of said metal-dialkyldithiocarbamates and become loaded therewith.

25. A process as defined in claim 1 wherein one or more metal-dialkyldithiocarbamate complexes are separated from said product aqueous soil slurry by a froth flotation treatment so as to obtain said treated aqueous slurry comprising a treated soil component having a metal content lower than that of said metal contaminated soil aggregate and an aqueous concentrate slurry comprising one or more of said metal-dialkyldithiocarbamate complexes.

26. A process as defined in claim 1 wherein soil aggregate particles having a size of less than 50 $\mu$m comprise at least 15% by weight (dry weight) of said contaminated soil aggregate.

27. A process as defined in claim 1 wherein said contaminated soil aggregate comprises a classified soil fraction representing soil particles having a size of less than 106 $\mu$m.

28. A process for decontaminating a metal contaminated soil aggregate so as to obtain a product comprising a treated soil component having a metal content lower than that of the metal contaminated soil aggregate, said metal contaminated soil aggregate comprising Pb, said contaminated soil aggregate comprising a classified soil fraction representing soil particles having a size of from 0.15 mm and smaller, said process comprising providing an initial aqueous soil slurry comprising said metal contaminated soil aggregate;

admixing a dialkyldithiocarbamate with said initial soil slurry so as to obtain a product aqueous soil slurry comprising an insoluble Pb-dialkyldithiocarbamate complex; and separating insoluble Pb-dialkyldithiocarbamate complex from said product aqueous soil slurry so as to obtain a treated aqueous slurry comprising a treated soil component having a Pb content lower than that of said metal contaminated soil aggregate, said dialkyldithiocarbamate being selected from the group comprising dialkyldithiocarbamates of formula

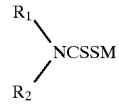

wherein $R_1$ and $R_2$ are independently selected from the group comprising alkyl groups of 1 to 6 carbon atoms, and M is selected from the group comprising alkali metals, alkaline earth metals, and ammonium groups of formula $R_3R_4NHR_5$, $R_3$, $R_4$, and $R_5$ being independently selected from the group comprising an atom of hydrogen and alkyl groups of 1 to 6 carbon atoms.

29. A process as defined in claim 28 wherein one or more dialkyldithiocarbamate is admixed with said initial aqueous soil slurry, said one or more dialkyldithiocarbamate being selected from the group comprising sodium dimethyldithiocarbamate, potassium dimethyldithiocarbamate, sodium diethyldithiocarbamate and potassium diethyldithiocarbamate.

30. A process as defined in claim 29 wherein the initial aqueous soil slurry has a pH of from 3.0 to 12.0.

31. A process as defined in claim 30 wherein said dialkyldithiocarbamate is admixed with said initial aqueous soil slurry at a concentration ranging from about 0.1 kg to about 25 kg thereof per tonne of said metal contaminated soil aggregate present in said initial aqueous soil slurry.

32. A process as defined in claim 31 wherein one or more of said water insoluble metal-dialkyldithiocarbamate complexes is separated from said product aqueous soil slurry by a liquid-liquid extraction treatment so as to obtain said treated aqueous slurry comprising a treated soil component having a metal content lower than that of said metal contaminated soil aggregate, said liquid-liquid extraction treatment comprising contacting said product aqueous soil slurry with a water immiscible liquid organic solvent for solubilizing one or more of said metal-dialkyldithiocarbamate complexes such that said solvent is able to take up one or more of said metal-dialkyldithiocarbamates and become loaded therewith.

33. A process as defined in claim 32 wherein when said solvent loaded with one or more metal-dialkyldithiocarbamates, said solvent is separated from said treated aqueous slurry.

34. A process as defined in claim 33 wherein said solvent comprises a member selected from the group comprising hexane, chloroform, carbon tetrachloride and mixtures thereof.

35. A process as defined in claim 33 wherein said solvent comprises hexane.

36. A process as defined in claim 32 wherein the contaminated soil aggregate comprises particles having a size of less than 50 $\mu$m in diameter, the particles having a size of less than 50 $\mu$m comprising at least 15% by weight (dry weight) of said contaminated soil aggregate.

37. A process as defined in claim 32 wherein said contaminated soil aggregate comprises a classified soil fraction representing soil particles having a size of less than 106 $\mu$m.

38. A process as defined in claim 31 wherein one or more metal-dialkyldithiocarbamate complexes are separated from said product aqueous soil slurry by a froth flotation treatment so as to obtain said treated aqueous slurry comprising a treated soil component having a metal content lower than that of said metal contaminated soil aggregate and an aqueous concentrate slurry comprising one or more of said metal-dialkyldithiocarbamate complexes.

39. A process as defined in claim 38 wherein said froth flotation treatment comprises adding an effective amount of a water immiscible solvent for said metal-complex to said initial aqueous soil slurry for facilitating the separation of said metal-dialkyldithiocarbamate complexes by froth flotation.

40. A process as defined in claim 39 wherein said solvent comprises hexane.

41. A process as defined in claim 38 wherein the contaminated soil aggregate comprises particles having a size of less than 50 $\mu$m, the particles having a size of less than 50 um comprising at least 15% by weight (dry weight) of said contaminated soil aggregate.

42. A process as defined in claim 38 wherein said contaminated soil aggregate comprises a classified soil fraction representing soil particles having a size of less than 106 $\mu$m.

43. A process as defined in claim 28 wherein the initial aqueous soil slurry has a pH of from 3.0 to 12.0.

* * * * *